United States Patent [19]

Pearson et al.

[11] Patent Number: 5,434,629
[45] Date of Patent: Jul. 18, 1995

[54] REAL-TIME LINE SCAN PROCESSOR

[75] Inventors: Eric C. Pearson, Waterloo; Ronald E. Strauss; David B. Merchant, both of Kitchener; Jacques S. Houde; Joseph D. Burjoski, both of Waterloo; Scott G. Lammers, Kitchener; Thomas P. Pawelko, Cambridge; Mark B. Wardell, Waterloo, all of Canada

[73] Assignee: Focus Automation Systems Inc., Waterloo, Canada

[21] Appl. No.: 169,665

[22] Filed: Dec. 20, 1993

[51] Int. Cl.⁶ .................... H04N 5/04; H04N 5/14
[52] U.S. Cl. .................................. 348/721; 348/88; 348/720; 382/206
[58] Field of Search ............... 348/88, 135, 719, 720, 348/721; 382/27, 28, 49; H04N 5/04, 5/14; 395/164

[56] References Cited

U.S. PATENT DOCUMENTS

| | | | |
|---|---|---|---|
| 4,363,104 | 12/1982 | Nusseier | 348/721 |
| 4,395,697 | 7/1983 | Dargel et al. | 382/27 |
| 4,395,698 | 7/1983 | Sternberg et al. | 382/27 |
| 4,395,700 | 7/1983 | McCubbrey et al. | 382/27 |
| 4,398,176 | 8/1983 | Dargel et al. | 382/27 |
| 4,484,346 | 11/1984 | Sternberg et al. | 382/27 |
| 4,546,444 | 10/1985 | Bullis | 364/550 |
| 4,685,144 | 8/1987 | McCubbrey et al. | 382/49 |
| 4,811,210 | 3/1989 | McAulay | 364/200 |
| 4,896,211 | 1/1990 | Hunt et al. | 348/132 |
| 4,922,337 | 5/1990 | Hunt et al. | 348/88 |
| 4,949,172 | 8/1990 | Hunt et al. | 348/88 |
| 5,046,190 | 9/1991 | Daniel et al. | 382/49 |
| 5,081,575 | 1/1992 | Hiller et al. | 395/325 |
| 5,126,845 | 6/1992 | Yamashita | 348/721 |
| 5,262,968 | 11/1993 | Coffield | 364/604 |
| 5,276,803 | 1/1994 | Iwase | 395/164 |
| 5,315,700 | 5/1994 | Johnston et al. | 395/163 |

OTHER PUBLICATIONS

Z. Hussain, "Digital Image Processing: Practical Applications of Parallel Processing Techniques", Ellis Horwood Limited, West Sussex, England, 1991, pp. 9-46.

J. W. V. Miller, "Architectural Considerations for Linear-Camera Vision Systems", Proceedings of SPIE vol. 1615, pp. 312-319, 1991.

B. Harkavy, "The Application of Flexible Machine Vision Architecture to the Inspection of Continuous Process Materials", Society of Manufacturing Engineering, Technical Paper #MS89-165, Society of Manufacturing Engineers, 1989.

(List continued on next page.)

Primary Examiner—Tommy P. Chin
Assistant Examiner—Vu Le
Attorney, Agent, or Firm—Jeffrey T. Imai; Arne I. Fors; D. Doak Horne

[57] ABSTRACT

A processor comprises a plurality of parallel channels having an upstream end and a downstream end, Each channel comprises a video data bus for continuously transferring video data from the upstream end to the downstream end, a plurality of modules serially connected along the video data bus and a host computer connected to the downstream end of the plurality of channels for receiving the video data. Each module comprises a crossbar switch, a pixel processing element connected to the crossbar switch, a delay resource connected across the crossbar switch and a microprocessor operably integrated within each module for controlling the operation thereof. The microprocessors of each module are serially connected together for transmitting and undertaking commands. The host computer is also connected to the microprocessor of each module for issuing commands for controlling the operation of the processor. The processor is capable of receiving video data from at least one line scan sensor and sequentially processes the video data to manipulate a high resolution image of an object moving relative to the at least one line scan camera.

20 Claims, 12 Drawing Sheets

OTHER PUBLICATIONS

N. Storey and R. C. Staunton, "An Adaptive Pipeline Processor for Real-Time Image Processing", Proceedings of SPIE vol. 1197, pp. 238-246, 1989.

J. W. V. Miller, "A survey of Image Processing Architectures for Linear Array Cameras", Conference Proceedings from Vision 90, pp. 7-1-7-11, Nov. 12-15, 1990.

MS-4032 Triggered-Scan Variable-Exposure CCD Camera, Product Data of Sierra Scientific, Oct. 1987.

J. Burjoski, "CYBERSCAN: A Breakthrough Architecture for Real-time Line Scan Processing", Presented at the International Robots & Vision Automation Show and Conference, Apr. 5-8, 1993, Detroit, Mich.

"CYBERSCAN: High Performance Line Scan Vision Processing", Product Brochure of Focus Automation Ssytems Inc., Apr., 1993.

"CCD Image Sensors and Cameras", Product Brochure of Dalsa Inc., Dec., 1991, pp. 146-155.

"OCULUS-300", Product Brochure of Coreco Inc., date unknown.

"MAXVIDEO 20", Product Brochure of Datacube Inc., date unknown.

Product Brochure of Data Translation Inc., 1987.

"Your Choice in Image Processing", Product Brochure of Image Technologies, Jun., 1990.

REAL-TIME LINE SCAN PROCESSOR

FIELD OF INVENTION

This invention relates to a parallel video image processor adapted to continuously process high speed line scan camera data in real time.

BACKGROUND OF THE INVENTION

Over the past decade, area-based CCD cameras have been successfully applied to a wide variety of industrial machine vision applications. Conventional area-based CCD cameras are based on a two dimensional matrix of photoelements. Typically, the entire matrix is scanned 30 times per second producing a complete frame of video data every 33 milliseconds.

Frame-based vision systems are the most common platforms for capturing and processing the video images produced by area-based cameras. In a typical area-based vision system, a full video frame from the area camera is digitized and captured into a frame buffer. Under microprocessor control, software algorithms are utilized to process the stored image and extract the features of interest. The pixel processing operations are usually accelerated by a hardware coprocessor. Based on the extracted features, external outputs may be triggered for process monitoring and/or control.

Area-based cameras and frame-based vision systems are popular for several reasons. Area-based cameras are easy to understand, set up and focus. Area-based cameras are inexpensive and widely available. Frame-based vision systems are plentiful and offer rich software toolsets at a reasonable price.

It is expected that frame-based vision systems will continue to dominate the machine vision industry for some time. However, frame-based cameras and vision systems have some serious limitations which restrict their use in many important industrial applications.

In spite of success to date, area-based vision systems have some significant limitations. Standard area-based CCD cameras are typically limited in resolution to approximately 800×600. High resolution area cameras are available but they are very expensive. The scanning frequency of most frame-based vision systems is constrained by the RS-170 video standard. This limits the speed at which images can be acquired and processed. Many systems are further complicated by interlaced image capture and a 4:3 pixel ratio. Further, it is often difficult to achieve uniform lighting over the two dimensional region that is scanned by the area camera. Non-uniform lighting reduces the overall performance of the vision system. Still further, frame buffers are finite and can only capture an image of finite length. Many applications require continuous processing of infinitely large images. Finally, frame-based vision systems with strobe lights are difficult to properly synchronize to continuous processes. It is difficult to achieve 100% inspection of a continuous process with a frame-based vision system.

These shortcomings restrict the extent to which area-based vision can be successfully applied. There is a broad class of vision problems for which the utilization of area cameras is either overly expensive, overly complex or simply impractical to utilize due to the fundamental limitations of area-based vision. For these applications, a different class of cameras and processors is required.

There is a large class of machine vision applications which can be considered "high performance". These applications are characterized by high resolution imaging, high speed image acquisition, high speed image processing, continuous image acquisition and processing.

Continuous web inspection, for example, is one of the most demanding industrial vision applications. A typical high speed web inspection application inspects a web which is 24 inches wide, with a web velocity of 400 inches per second (2000 feet/minute), performs 100% surface inspection and detects defects as small as 0.020 inches. A vision system that inspects such a web would require a cross-web resolution of at least 2048 pixels and would need to continuously scan and process over 70 million pixels per second.

A frame-based vision system is impractical for such a demanding application. Although there have been attempts to apply frame-based vision to these applications, the results are typically characterized by limited processing capability, high cost, complexity or all of the above.

Line scan cameras exhibit certain qualities which enable them to overcome the limitations of area-based cameras and be successfully applied to high performance vision applications. Line scan cameras are based on a linear CCD array with a single row of pixels. A continuous, two-dimensional image of a moving object is created by repeatedly scanning the single row of pixels.

Line scan cameras have the following advantages over area-based cameras. Linear array sensors are available with horizontal resolutions of over 6000 pixels. High resolution linear arrays are easier to fabricate and therefore less expensive than their area-based equivalents. By scanning the linear array at a high frequency, very high vertical image resolution is attained. Scanning of the linear array can be triggered continuously, thereby generating a continuous image of the moving object. Line scan cameras view only a single line on the object of interest. This narrow line is much easier to uniformly illuminate than the two dimensional region required for area-based cameras. Optical encoders synchronized to object motion may be utilized to trigger the horizontal line capture.

Line scan cameras are well suited to high performance vision applications because of their ability to generate high resolution, continuous images at high scanning frequencies. The major limitation of conventional line scan cameras is low light sensitivity at high scanning frequencies. When the horizontal scanning frequency is high, the time interval over which each photoelement is gathering light is proportionately reduced. For example, if a line scan camera is being scanned at 20,000 lines per second, each pixel is only integrating light for 50 microseconds before it is transferred to the output shift register. Thus, to operate at high scanning speeds, extremely high intensity lights are required. Such high intensity illumination is often impractical and, as such, conventional line scan cameras are typically limited to scanning at 5 kHz or less.

Time Delay and Integration (TDI) line scan cameras have emerged as a solution to high speed line scanning. TDI cameras retain the positive features of line scan cameras but have dramatically improved light sensitivity. A TDI image sensor is comprised of a number of adjacent linear rows of photoelements. The motion of the object of interest is precisely synchronized to the TDI sensor. As the object moves along the TDI sensor array, multiple exposures of the same portion of the object are accumulated down each column of photoelements. The total accumulated charge from the multiple exposures is then transferred to the output shift register in the same manner as a conventional linear array camera. The net effect is an increase in the exposure time for each pixel by a factor equal to the number of rows in the TDI sensor. For example, a TDI sensor with 96 stages exhibits up to 80 times the light sensitivity of the equivalent conventional line scan camera. With this vastly improved light sensitivity, scanning at high frequencies is achievable with reasonable light sources.

TDI cameras are not without their drawbacks, however. In order to obtain a sharp image, the TDI sensor must be precisely synchronized to the motion of the object being viewed. The instantaneous scan-to-scan velocity of the object must be tightly controlled. Furthermore, since the image is exposed multiple times, the object must be very nearly flat over the length that it is projected onto the TDI array.

With the greatly improved light sensitivity provided by TDI technology, high scanning frequencies are possible utilizing conventional light sources such as fluorescent tubes. High speed line scanning is no longer limited by light sensitivity. Rather, the problem now is processing the torrent of video data that is produced by the TDI camera. A 2048 element TDI sensor scanned at 35,000 Hz, continuously produces over 70 million pixels per second. To accommodate this data rate, multiple output taps are provided. For example, the DALSA CT-E1-2048 TDI camera provides eight taps, each responsible for scanning 256 contiguous pixels of the 2048 element array.

TDI line scan cameras are able to generate high resolution images of objects (or webs) moving at extremely high speeds. This capability opens up a world of new, high performance vision applications which were previously impossible. However, the number of industrial applications that utilize TDI cameras has been, to date, extremely limited because there does not exist a cost effective vision processor that is capable of performing sophisticated two dimensional image processing on the continuous deluge of data that issues from the TDI camera.

To illustrate the order of magnitude of processing power required for TDI applications, the web inspection example described earlier utilizing an 8-tap TDI camera with 2048 pixel horizontal resolution scanning at 35,000 lines per second will produce the required image. However, each output tap produces nearly 9 million pixels per second totalling over 70 million pixels per second for the camera. A modest set of vision algorithms will require approximately 25 operations per pixel resulting in a sustained demand for over 1.75 billion operations per second (1,750 MOPs). Clearly this is far beyond the capabilities of most frame-based vision systems, especially those that process pixel data utilizing software algorithms.

There are many excellent frame-based vision processors available today. However, the unique characteristics of high speed line scan cameras impose additional requirements on the vision processor. A high speed line scan vision processor must have no frame limitations, continuous processing capability, real-time pixel processing at line scan rates and processing of parallel taps.

Several approaches have been taken to accomplish the processing of high speed line scan camera data, with the most common approach of utilizing a conventional frame-based vision processor with a line scan camera interface. Unfortunately, the fundamental limitations of frame-based architectures (described above) renders them unsuitable for most high speed line scan processing applications. (see B. Harvey, "The Application of Flexible Machine Vision Architecture to the Inspection of Continuous Process Materials", SME Technical Paper #MS89-165, Society of Manufacturing Engineers, 1989.)

In order to achieve extremely high processing rates, a parallel processing architecture is required. Many parallel processing architectures have been proposed for high speed number crunching. (see Z. Hussain, "Digital Image Processing: Practical Applications of Parallel Processing Techniques", Ellis Horwood Limited, West Sussex, England, 1991.) However, the "pipeline" architecture is particularly well suited to machine vision. (see N. Storey and R. C. Staunton, "An Adaptive Pipeline Processor for Real-Time Image Processing", Proceedings of SPIE Volume 1197, pp 238-246, 1989 and J. W. V. Miller, "Architectural Considerations for Linear-Camera Vision Systems", Proceedings of SPIE Volume 1615, pp 312-319, 1991.)

There are a few commercial systems available which have been designed specifically for line scan processing. Typically, these systems were designed to process conventional line scan data and lack the power required to process TDI camera data in real-time (see J. W. V. Miller, "A survey of Image Processing Architectures for Linear Array Cameras", Conference Proceedings from Vision 90, pp 7-1-7-11, November 12-15, 1990.). A few systems exist which can perform realtime processing at high pixel data rates, but are characterized by high cost and excessive complexity. Furthermore, these systems are often custom built for specific applications and therefore lack flexibility.

SUMMARY OF THE INVENTION

The disadvantages of the prior art may be overcome by providing a vision processor adapted to continuously process high speed line scan camera data in real-time.

According to one aspect of the invention, there is provided a processor for processing video data from line scan cameras. The processor comprises a plurality of parallel channels having an upstream end and a downstream end. Each channel comprises a video data bus for continuously transferring video data from the upstream end to the downstream end, a plurality of modules serially connected along the video data bus and a host computer connected to the downstream end of the plurality of channels for receiving the video data. Each module comprises a crossbar switch, a pixel processing element connected to the crossbar switch, a delay resource connected across the crossbar switch and a microprocessor operably integrated within each module for controlling the operation thereof. The microprocessors of each module are serially connected together for transmitting and undertaking commands. The host computer is also connected to the microprocessor of each module for issuing commands for controlling the operation of the processor. The processor is capable of receiving video data from at least one line scan sensor and sequentially processes the video data to manipulate a high resolution image of an object moving relative to at least one line scan camera.

According to another aspect of the invention, there is provided a sensor module for converting the video data from at least one line scan sensor to a format readable by the processor. The sensor module includes a sensor interface for synchronizing and controlling at least line scan sensor, an encoder interface for receiving an encoder signal and transmitting the encoder signal to the sensor interface. The sensor interface is adapted to generate a lamp control signal and a sensor control signal responsive to the encoder signal. A video image generator is connected to the crossbar switch and connectable to a video monitor. The video generator receives a copy of the video data and transforms the video data to a video image output.

According to another aspect of the invention, there is provided a buffer module for storing a defined "golden template" image and template matching the high resolution image with the defined image to generate a difference image.

According to another aspect of the invention, there is provided a blob module for performing greyscale connectivity analysis on the difference image for extracting object descriptor information from the video data.

According to another aspect of the invention, there is provided a method of continuously processing video data of an object moving relative to at least one line scan sensor to extract features and measurements of the object. The method comprising the steps of:
  synchronizing and controlling at least one line scan sensor generating a video image of the object comprising a stream of video data;
  normalizing the stream of video data;
  transferring the stream of video data onto a video data bus;
  comparing the stream of video data with a golden template image of the object and generating a difference image;
  performing greyscale connectivity analysis on the difference image and extracting features and measurements;
  outputting said features and measurements to a host computer.

According to another aspect of the invention, the method further includes a step of performing histogram computations on the stream video data and generating a signal for modulating a power source for a light source illuminating the object thereby maintaining a substantially constant light intensity illuminating said object.

According to yet another aspect of the invention, the method further includes transferring a copy of the stream of video data to a video generator and generating a video display of the object.

According to yet another aspect of the invention, at least two streams of video data are simultaneously processed in parallel.

DESCRIPTION OF THE DRAWINGS

In drawings which illustrate embodiments of the invention.

DESCRIPTION OF THE INVENTION

Figure 1:
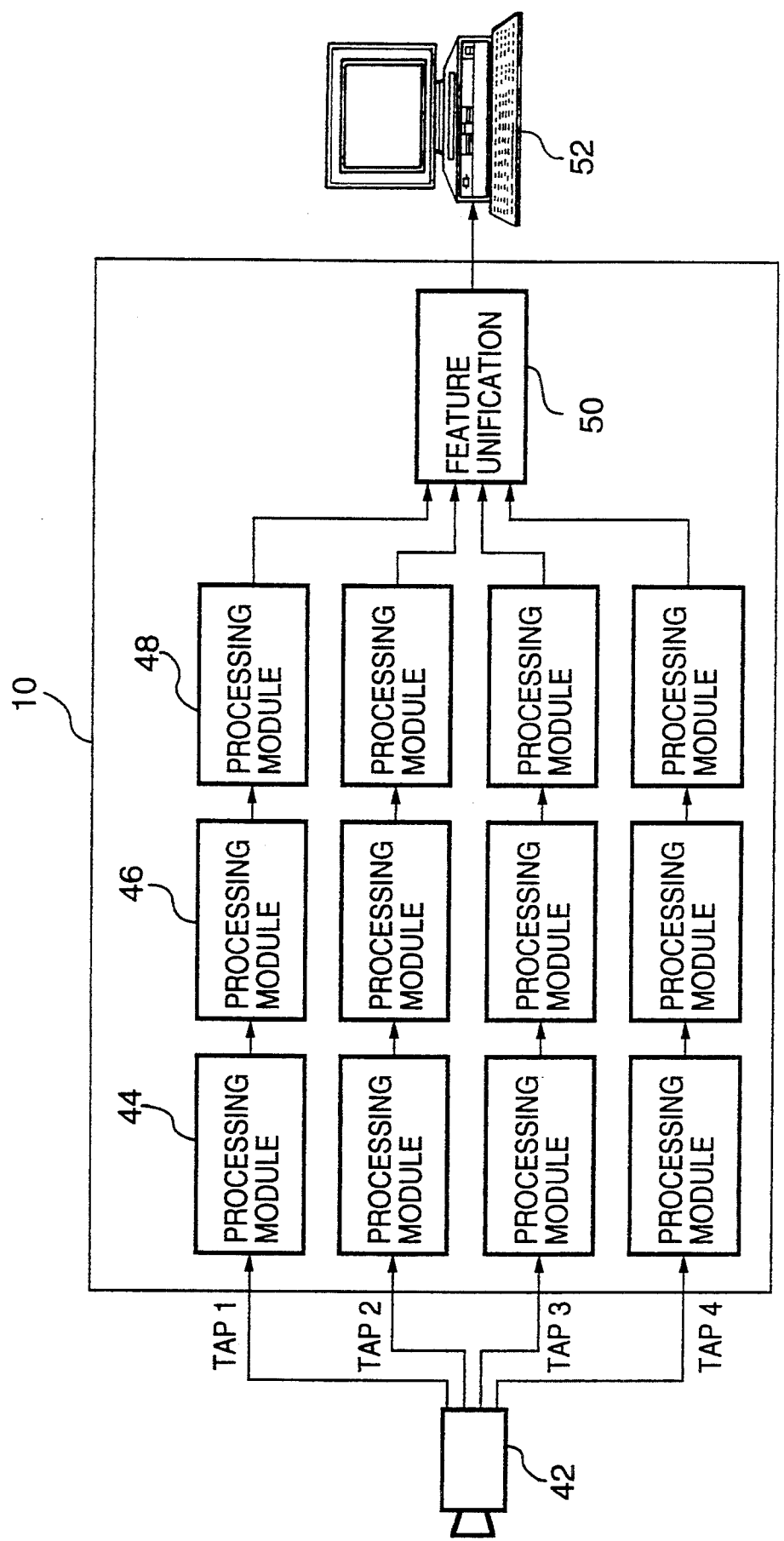
FIG. 1 is a schematic of the pipelined parallel processing of the present invention.

Referring to FIG. 1, the processor of the present invention is schematically illustrated. The processor 10 is a pipelined parallel processor. FIG. 1 illustrates a typical symmetrical set up. Depending on the application, nonsymmetrical arrangements could be utilized. In other words, each pipeline could have different series of modules to achieve different outputs therefrom.

Processor 10 allows multiple video streams to be organized in channels and processed in parallel. Extracted feature data from multiple parallel channels may be unified and presented to the host computer 52 as a single stream of feature data.

Video data from each tap of the line scan sensor 42 is continuously processed by a series of modular processing elements 44, 46 and 48. Early processing modules 44 perform an image processing operation, such as spatial filtering. Later modules 46 and 48 extract feature information, such as object size and location. Optionally, the information is unified by module 50 and then presented to a host computer 52. Each processing module is designed to perform a specific task in real-time. Intermediate frame buffers are not required, so a continuous stream of feature data is extracted from the continuous stream of input video. More complex processing operations can be accomplished by adding additional modules to the pipeline without diminishing the overall throughput of the processor. Thus, the pipeline architecture provides a system with a linearly scalable pixel processing bandwidth.

Processor 10 implements all pixel processing operations in hardware. In this way, extremely high processing rates can be attained. Preferably, each processing module is capable of continuously processing at least 20 million pixels per second in real-time.

Figure 8:
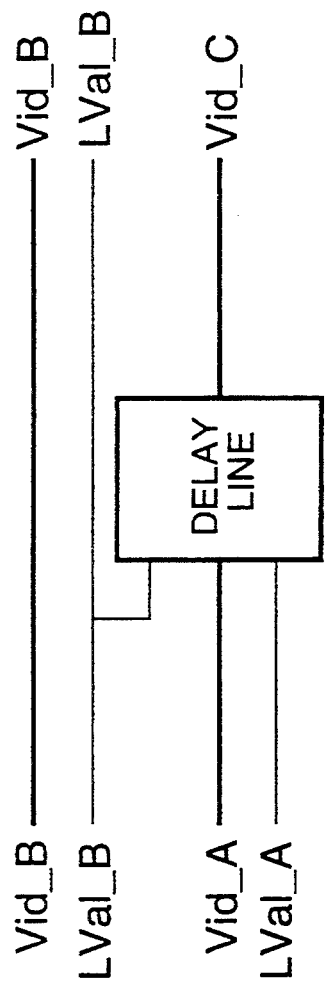
FIG. 8 is a schematic of a delay resource of each module of the invention of FIG. 1.
Figure 9:
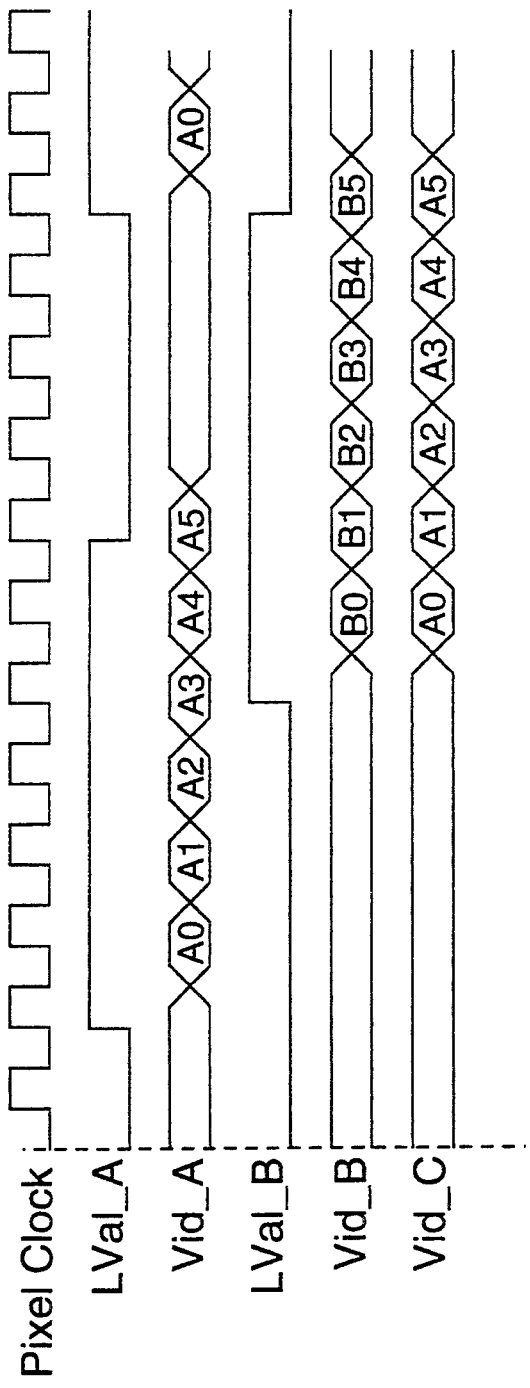
FIG. 9 is a line signal diagram for aligning two signals utilizing the delay resource of FIG. 8.

Referring to FIGS. 8 and 9, two video signals A and B are illustrated, where A leads B by several clock cycles. Each digital video signal comprises a line valid signal in 0–62 bits. For example, a sensor that produces an 8 bit video output would be represented by a 9-bit digital video signal comprising the 8 bit video data plus one line valid bit. The line valid signal indicates the period during which the video data bits contain valid pixel data. The line valid signal precedes the start of the video data by one clock cycle and ends at the start of the last pixel in the line of video data. The number of pixels per line is determined by the video sensor format, up to 16,358. To align signals A and B so that the two signals can be processed together, a new signal C is produced, which signal contains pixel data from A but is delayed to align with B. The delay function is described in detail below.

The processor 10 has a master pixel clock which generates a series of pulses having a predetermined period and frequency. The pixel clock synchronizes the processing elements within the module pipeline and is independent of the display output pixel clock which is incorporated in the camera module. The master pixel clock may operate at any frequency between 10 and 20 MHz.

Figure 2:
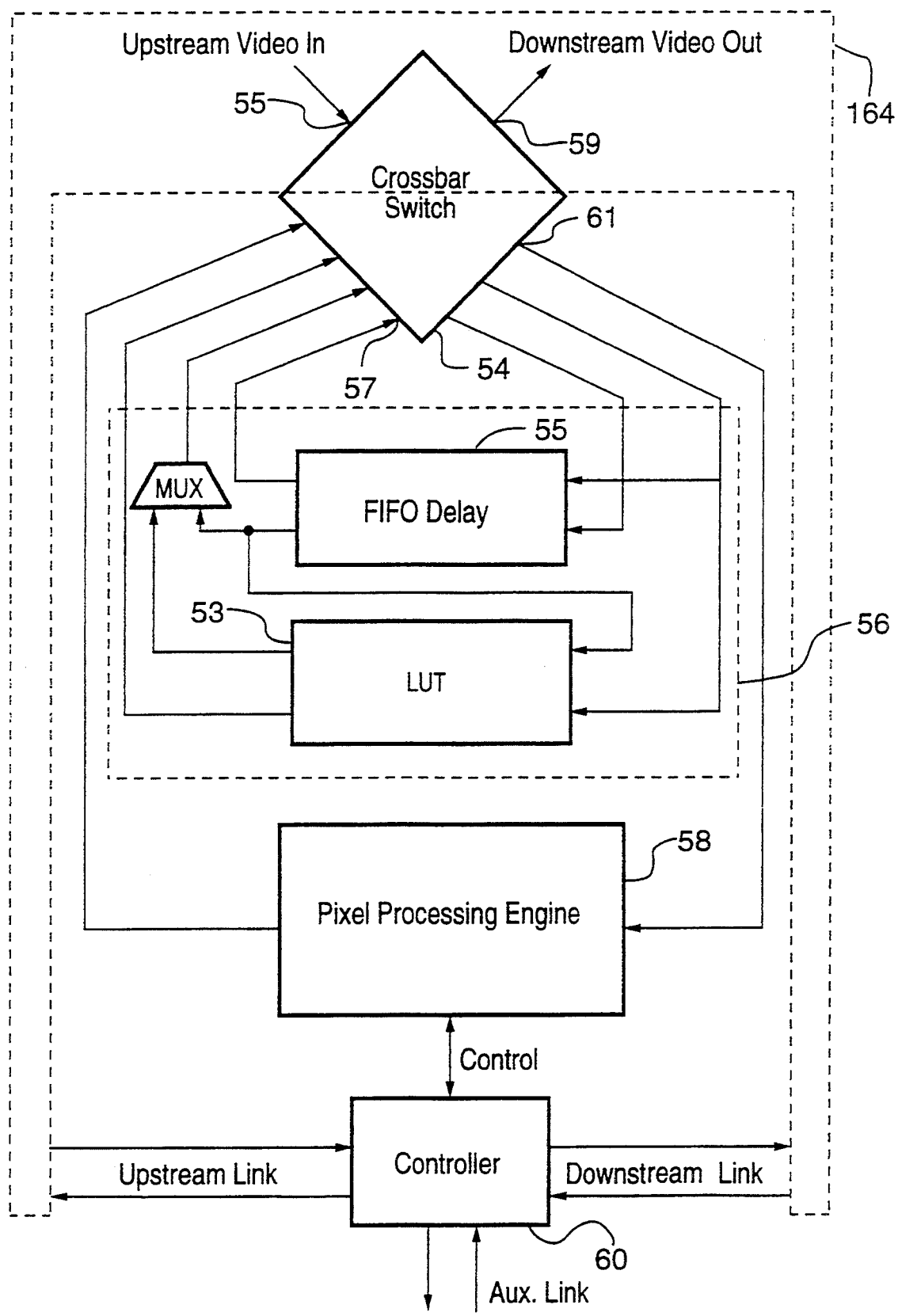
FIG. 2 is a schematic of the common architecture of all the modules of the invention of FIG. 1.

Referring to FIG. 2, all modules 44, 46 and 48 of processor 10 share a common architecture. There are four basic components to each of the modules 44, 46 and 48: a crossbar switch 54, a delay/LUT resource 56, a pixel processing element (engine) 58 and a microprocessor controller 60.

Crossbar switch 54 is a clock doubled 64 bit×64 bit programmable switch operating at 40 MHz and facilitates the establishment of video data paths in and out of the module. Crossbar switch 54 has two sets of 64 bit inputs. One set 55 receives upstream video data from an upstream module and one set 57 receives video data output from within the module. Crossbar switch 54 has two sets of 64 bit outputs. One set 59 outputs video data to a downstream module and one set 61 outputs video data to the module.

In the preferred embodiment, the crossbar switch 54 is configured such that each path is an independent, unidirectional, non-pipelined 1 bit bus. The crossbar switch is a controller utilizing 65 8 bit registers wherein registers 0 to 63 are utilized to program the individual crossbar connections and register 65 is the control register utilized to determine the bus widths and data direction.

Delay/LUT resource 56 is connected between output 61 and input 57 which enables two incoming digital video streams to be aligned before processing. In the preferred embodiment, delay/LUT resource 56 comprises a FIFO (First in First Out) sequential memory element 55 and a LUT (Look-up Table) 53 clocked with the video time element. Memory element 55 preferably has 2k of memory which can cause up to a 2000 pixel delay. LUT 53 has a static RAM capable of storing lines of data, preferably up to 32k.

Pixel processing element 58 is connected between output 61 and input 57. Pixel processing element 58 is the real-time hardware engine that performs the module's pixel processing function. Each module has a unique function. For example, the pixel processing element of the sensor module 44 interfaces between the sensors, manipulates the stream of video data and processes the data for a video output.

Pixel processing element 58 preferably operates at 20 million pixels per second. By utilizing multiple streams with more than one pixel processing element 58, the rate of processing can be enhanced.

Microprocessor controller 60 is an embedded microprocessor which is electrically connected to the pixel processing element 58 for controlling the operation of the module and communicating with other modules within the system. The microprocessor controller 60 is designed for real-time parallel processing. The microprocessor controller 60 is utilized to establish communication links which are utilized to facilitate communication with the host computer 52.

The microprocessor controller 60 is well known in the art. The microprocessor has its own local memory with point to point communication links to connect like microprocessors together. During image processing applications, one module may be required to forward its processing results to the next downstream module for further processing. This transfer of data is accomplished via the microprocessor controller 60 communication links that are configured as a daisy-chain between all modules. The communications network also enables the host computer 52, connected at the downstream end of the daisy chain, to send commands to and receive results from any module of the processor 10. Each module will forward a message down the daisy-chain until it arrives at the destination module.

Microprocessor controller 60 is a VLSI component which can be programmed utilizing any suitable high level language. However, as discussed further, the host computer 52 communicates with the microprocessor controller 60 in order to minimize the programming.

The microprocessor controller 60 is integrated within each module and is adapted to receive external commands for manipulating the processing hardware appropriately. A dynamic memory DRAM is utilized to store code and data for controlling the operation of the controller 60. The host computer 52 can issue high level commands to each microprocessor controller 60 to configure and operate each module.

An Application Programming Interface (API) is provided which is a library of C-callable functions which allows a host computer programmer to configure and run all aspects of processor 10 applications. All aspects of processor 10 can be configured and controlled from the host computer 52 utilizing the API. Direct programming of the processor 10, including each of the modules 44, 46, 48, 50 and 51, and their associated processing hardware is not required.

The microprocessor controller 60 alone is responsible for manipulating the complex, low level hardware on the module. Utilizing the API, the program in the host computer 52 simply instructs the microprocessor controller 60 to perform particular functions and the microprocessor controller 60 interfaces with the hardware registers to see that such functions are done. Thus, the presence of the microprocessor on each processor 10 module relieves the application programmer from having to understand and program the low level hardware.

Since each processor 10 module performs its specific image processing function in hardware, not software, the host application program is only required to configure the module to establish its operating parameters. Extensive software programming is not required in order to perform a particular machine vision function.

The combined effect of these factors is to significantly reduce the complexity of programming as compared to most pipelined image processors.

Each module is serially connected along video data bus 164 for transferring video data between processing modules. Video bus 164 is connected to the crossbar switch 54 of each module through a 96 pin DIN connector. In order to provide flexible data flow between the modules, a programmable 64-bit video data bus provides for up to 64 bits of video data to flow in and out of each module. Since the video data travels a relatively short distance from one module to the next, high pixel data transfer rates can be achieved from module to module.

The width of the video data paths which flow along the video bus 164 is programmable from 1-bit (binary) to 62-bits, including any number of bits in between. For instance, three 8-bit video streams may flow into a module, undergo lookup table processing and flow out as a single 8-bit resultant video stream. The flexibility of the video bus 164 allows many different applications to be configured utilizing the same set of processing modules.

Figure 3A:
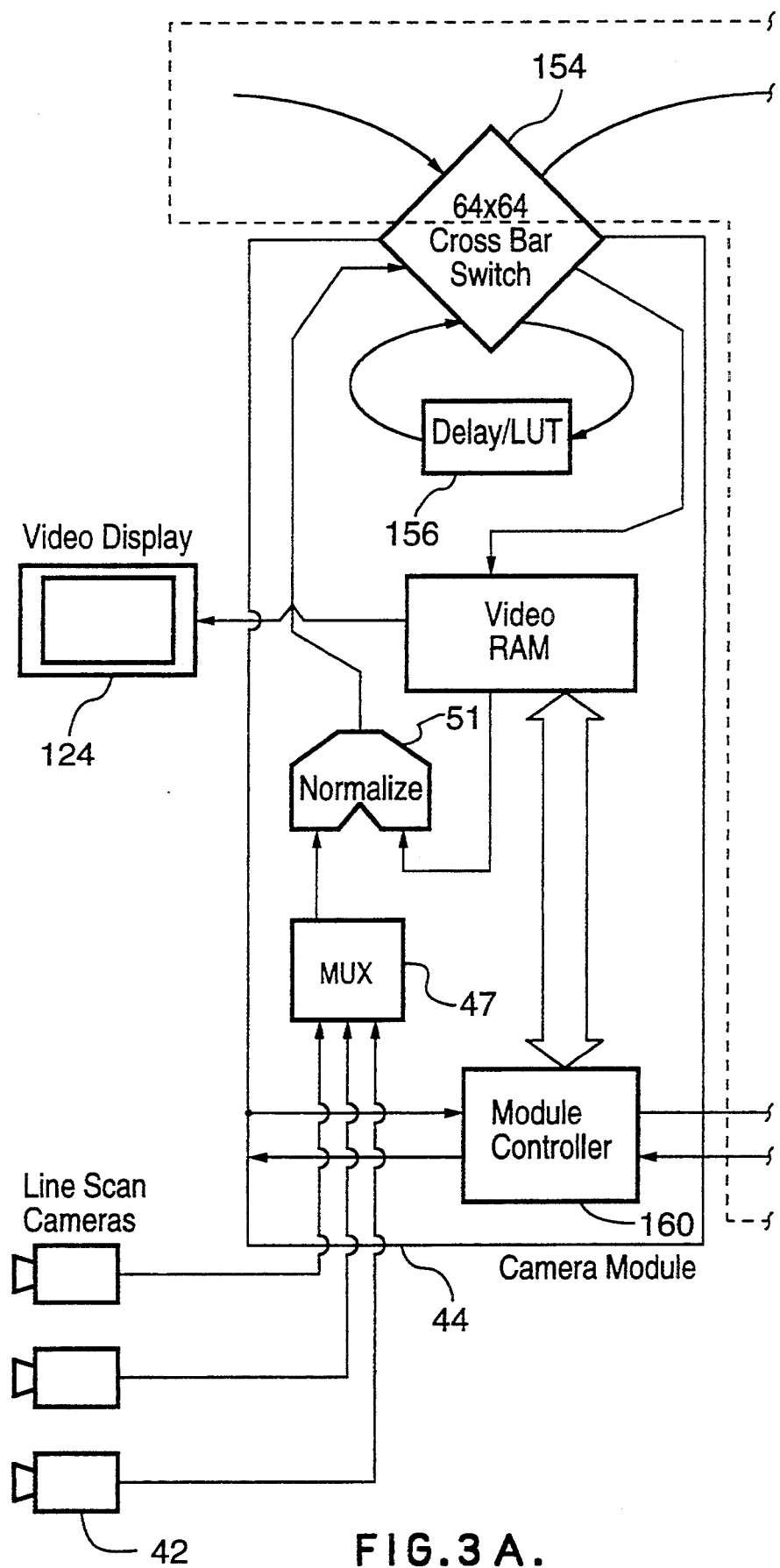
FIGS. 3A, 3B, 3C is a schematic of a typical configuration of three modules of the invention of FIG. 1.
Figure 3B:
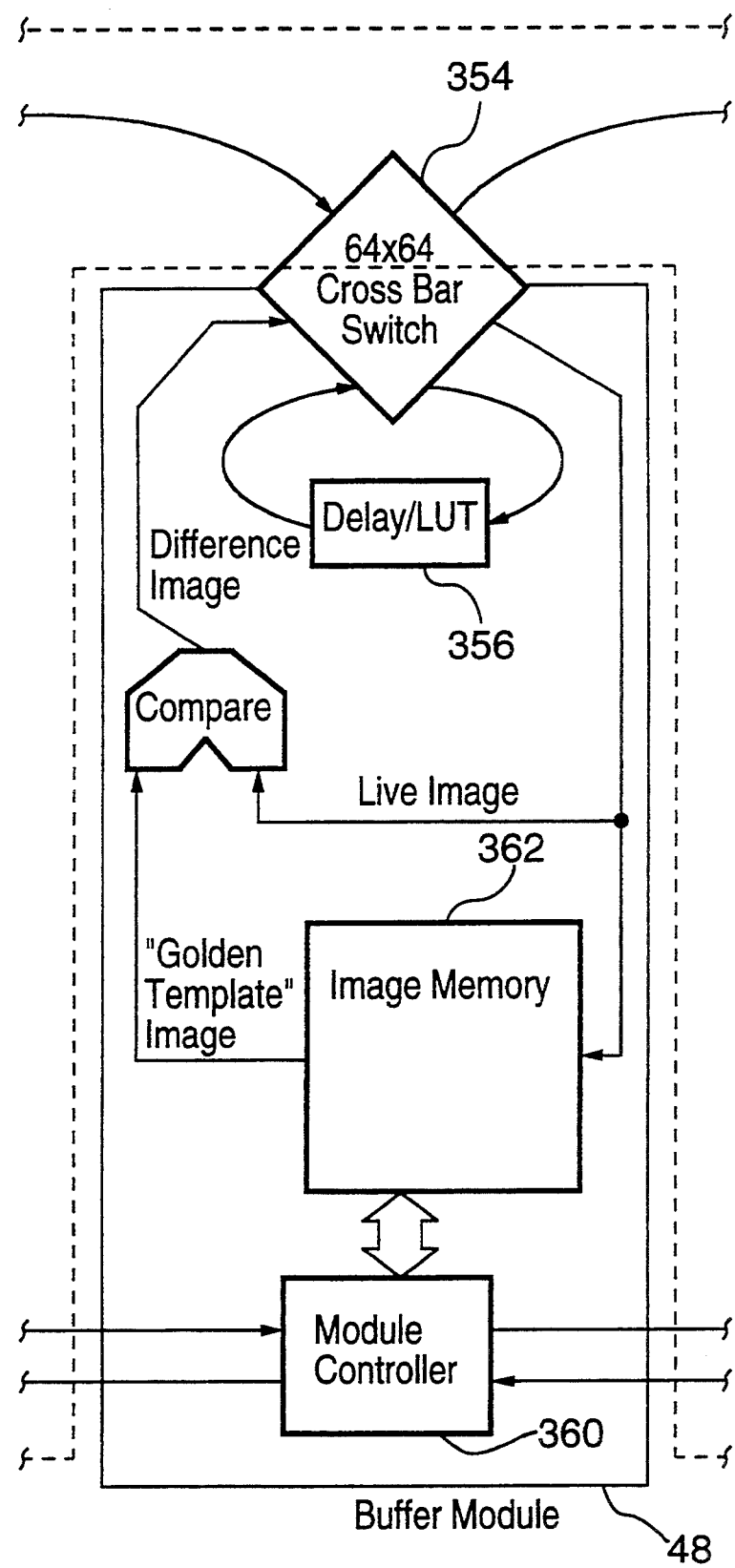
Figure 3C:
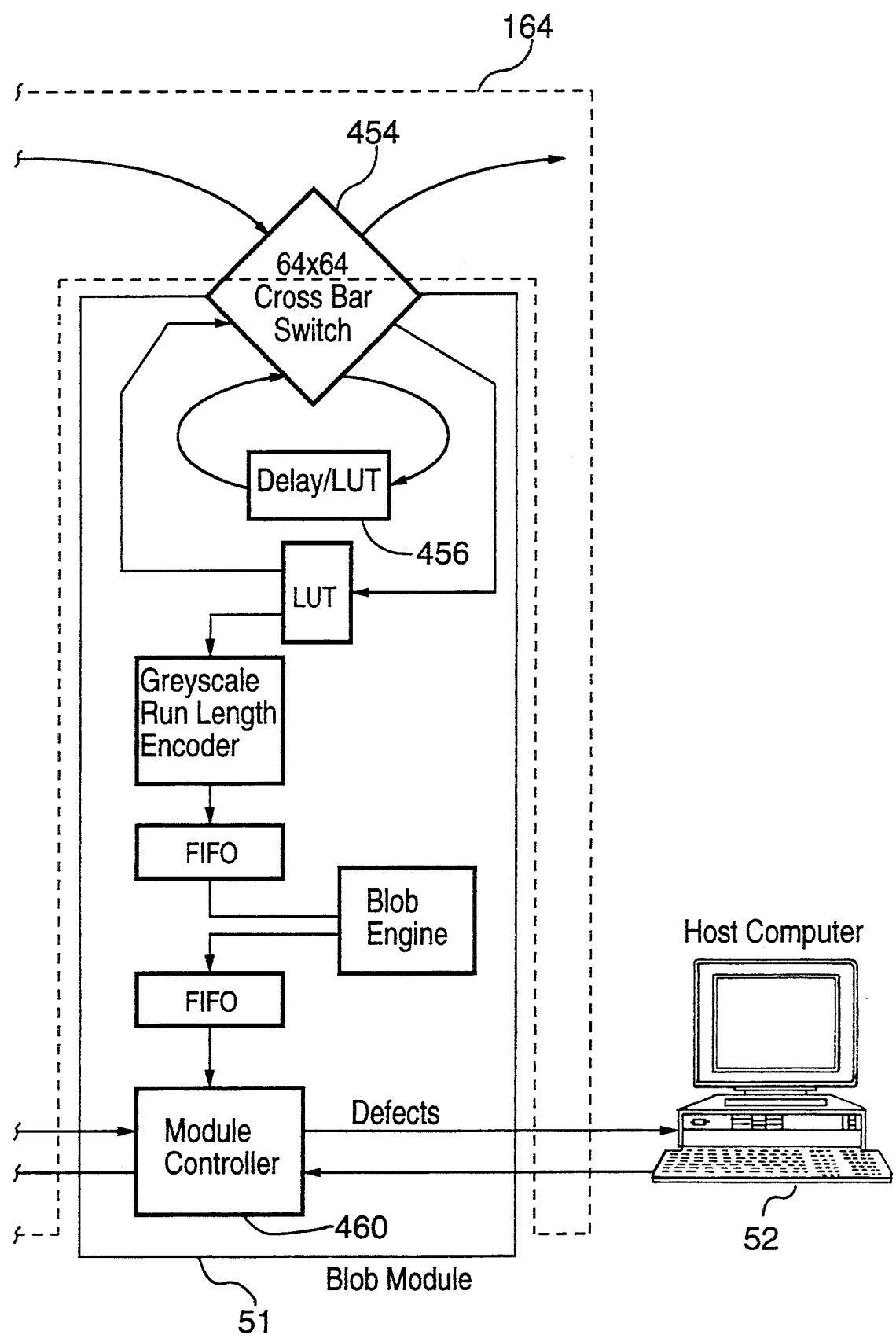

FIGS. 3A, 3B and 3C illustrate an example of the manner in which modules 44, 48 and 51 are serially connected together on the video bus 164 to form an image processing pipeline. The video bus 164 also connects together the high speed communication links of the microprocessor controller 60. Thus, in addition to the video processing pipeline, there exists a parallel pipeline of microprocessor controllers 60 which are utilized to coordinate and control overall system operation.

The interface between processor 10 and industry standard line scan sensors is sensor module 44. The sensor module 44 provides sensor synchronization and control, background normalization, encoder interface and video display. The sensor module 44 has two components: a common motherboard plus a sensor-specific daughter board or sensor adaptor. In order to accommodate other line scan sensors, only the daughter board needs to be designed.

Figure 4A:
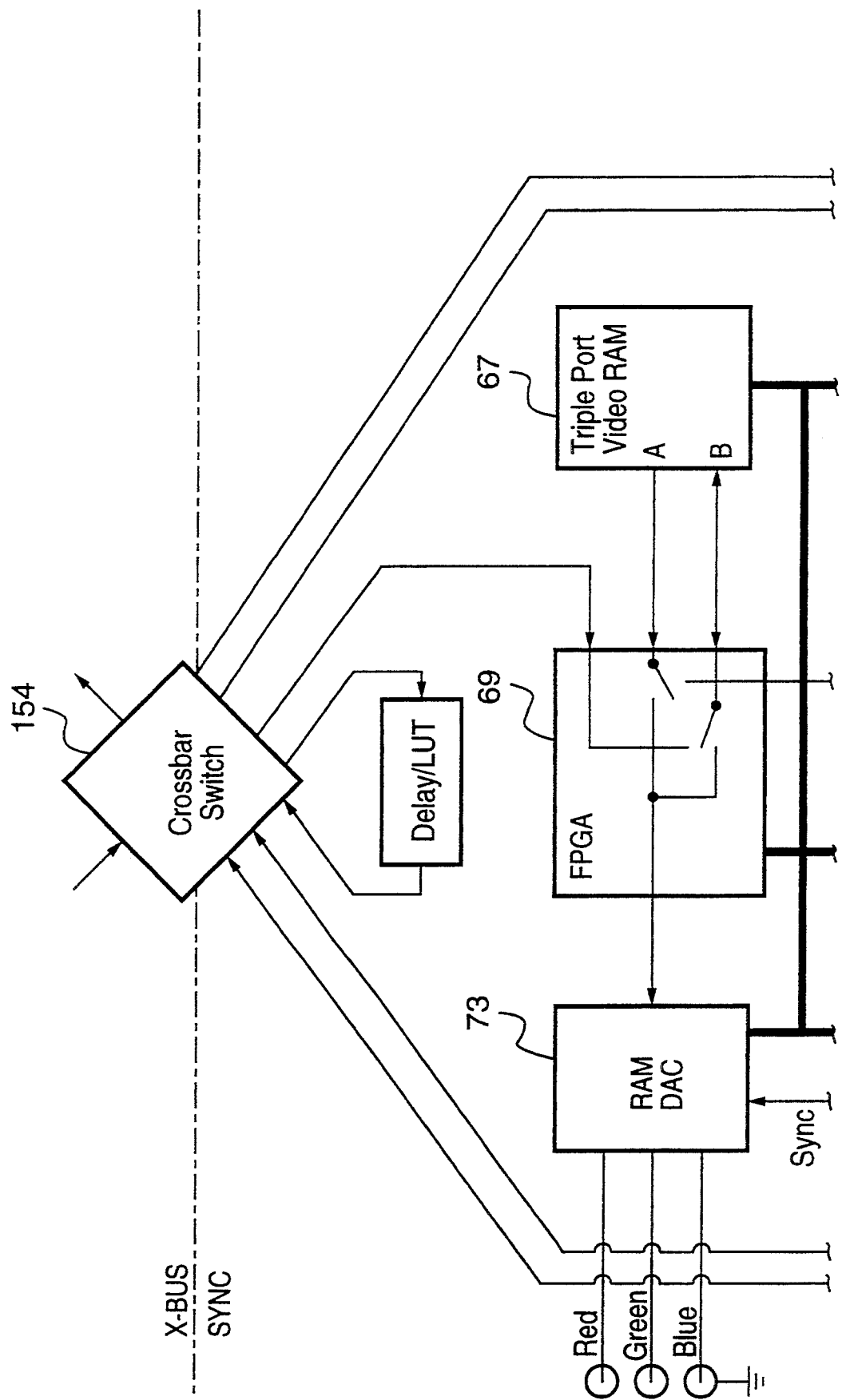
FIGS. 4A, 4B, 4C is a schematic of a camera module of the invention of FIG. 1.
Figure 4B:
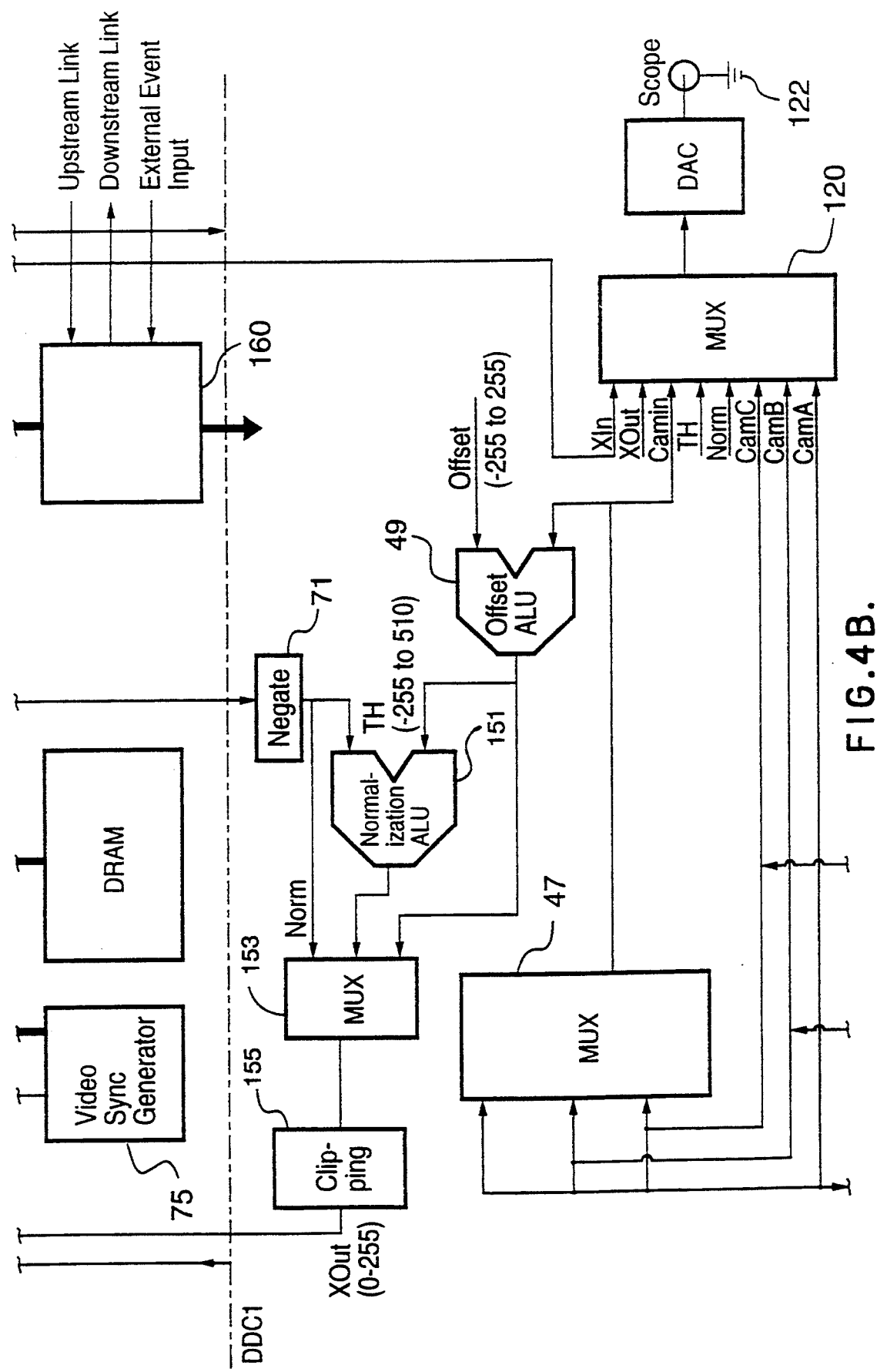
Figure 4C:
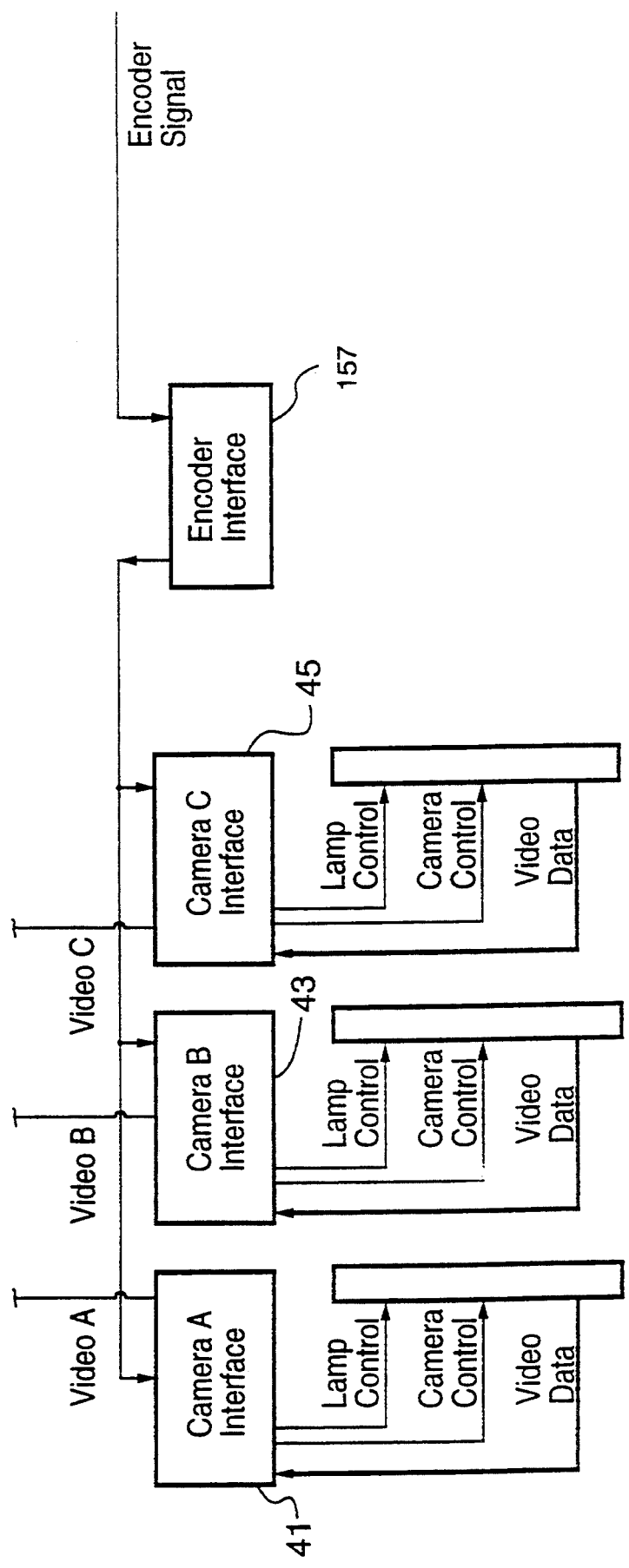

Referring to FIGS. 4A, 4B and 4C, the sensor module 44 comprises sensor interfaces 41, 43 and 45 connected to a multiplexer (MUX) 47. The multiplexer 47 receives a plurality of video inputs and generates a single 8 bit video output. An offset circuit (ALU) 49 is connected to the multiplexer 47. Offset circuit 49 has two inputs and a single output. One of the inputs receives a selectable 9 bit stream of offset data comprising a data stream of digital values of between −255 and 255 which ensures that a black pixel has a zero pixel value. The offset data is added to the video data to place the data in the proper frame of reference.

The output of offset circuit 49 is fed to a normalization circuit 151. Video normalization removes the non-uniformities introduced by imperfections in the lighting and optics. The normalized data, together with the output of the offset circuit 49 and normalization data are fed into multiplexer 53. Multiplexer 153 has three inputs and a single output. The output of multiplexer 153 is connected to a clipping circuit 155. The output of clipping circuit 155 is connected to the input of crossbar switch 154.

Each sensor interface 41, 43 and 45 generates a lamp control signal and a sensor control signal. An encoder is integrated into the transport mechanism of the object being inspected and generates an encoder signal proportional to the amount of object passing the area being inspected by the sensors. The encoder signal is transferred back to the sensor module 44 to an encoder interface circuit 157 which communicates with each of the sensor interfaces 41, 43 and 45. In response to the encoder signal, each sensor interface will generate a lamp control signal and a sensor control signal for synchronizing the operation of the lamp and CCD sensor. The operation of the CCD sensor in a TDI mode is well known in the art.

The sensor module 44 controls any number of digital line scan sensors or taps from a single line scan sensor. The preferred number being up to three digital line scan sensors or three taps from a single sensor. The sensor module 44 receives video data from a sensor 42, transfers the data to multiplexer 47 (MUX) and combines the video data stream with a 9 bit offset stream in offset circuit 49 (ALU) to produce a 10 bit video data stream.

The 10 bit video data stream is then transferred to normalizing circuit 151 to normalize the data. Normalization data is read from the video memory 67, through FPGA circuit 69, and subtracted from the incoming video stream. The normalization data stream is representative of the noise floor of the data stream. The normalization data is subtracted from the video data stream to minimize the adverse effects of non-uniformities in illumination and lens roll-off. The 8 bit normalized video data stream is then transferred to multiplexer 153 (MUX). A resulting 10 bit video data stream is then transferred to clipping circuit 155 to clip the video data stream to an 8 bit video data stream. The 8 bit video data stream is then presented to the crossbar switch 154 for transferring to video bus 164 for transfer to other modules for subsequent processing. The video data stream may also be switched back into the module and stored in the video RAM memory 67 for display on the video monitor.

The sensor module 44 is also provided with an oscilloscope output 122 which is operably connected to up to eight different points within the sensor module 44 for sampling the video digital signal within the module. In the preferred embodiment, taps are taken from the video stream coming from upstream modules, the video stream leaving the module, the combined video stream from the sensors, the normalized video data stream and the video stream from each individual sensor which are fed into a multiplexer 120 for selectively displaying each of the signals.

The sensor module 44 is also provided with a facility to generate a video output to a monitor 124 for displaying an image of the object as it passes through the inspection area of the sensors. In the preferred embodiment, a 14.31818 MHz crystal video clock is utilized to generate an RS-170 interfaced output. The video facility comprises a Field Programmable Gate Array circuit 69 (FPGA) which is connected to an internal output 61 of crossbar switch 54. FPGA circuit 69 is connected between a triple port video RAM memory 67, the negate circuit 71 and the digital to analog converter 73. FPGA circuit 69 controls the transfer of date from video memory 67 to video digital to analog converter 73. The video stream passing into the facility provides an event controller for microprocessor 160.

RAM memory 67 has three ports: port A, port B and a microprocessor data bus port. Ports A and B are connected to the FPGA circuit 69 and the microprocessor data bus port is connected to the microprocessor 160. Port A can either output normalized data or output video data. Port B can either capture a video stream from the video bus 164 or output video data. Transfers via ports A and B are controlled by circuit FPGA 69 and the microprocessor 160. As is apparent, video generation can display from either port A or from port B.

Video sync generator 75 is controlled by the microprocessor 160 and generates a video sync signal for the digital to analog converter 73.

Digital to analog converter 73 converts a digital stream of pixel values from FPGA 69 into three analog video channels, namely, red, green and blue. The three analog channels are sent to the monitor 124 for display. In a manner well known in the art, digital to analog converter 73 includes a 256×24 bit look-up table which maps pixel values into 24 bit RGB outputs that drive the video digital to analog converters. This allows the display of up to 256 colors from a palette of 16 million.

Figure 5:
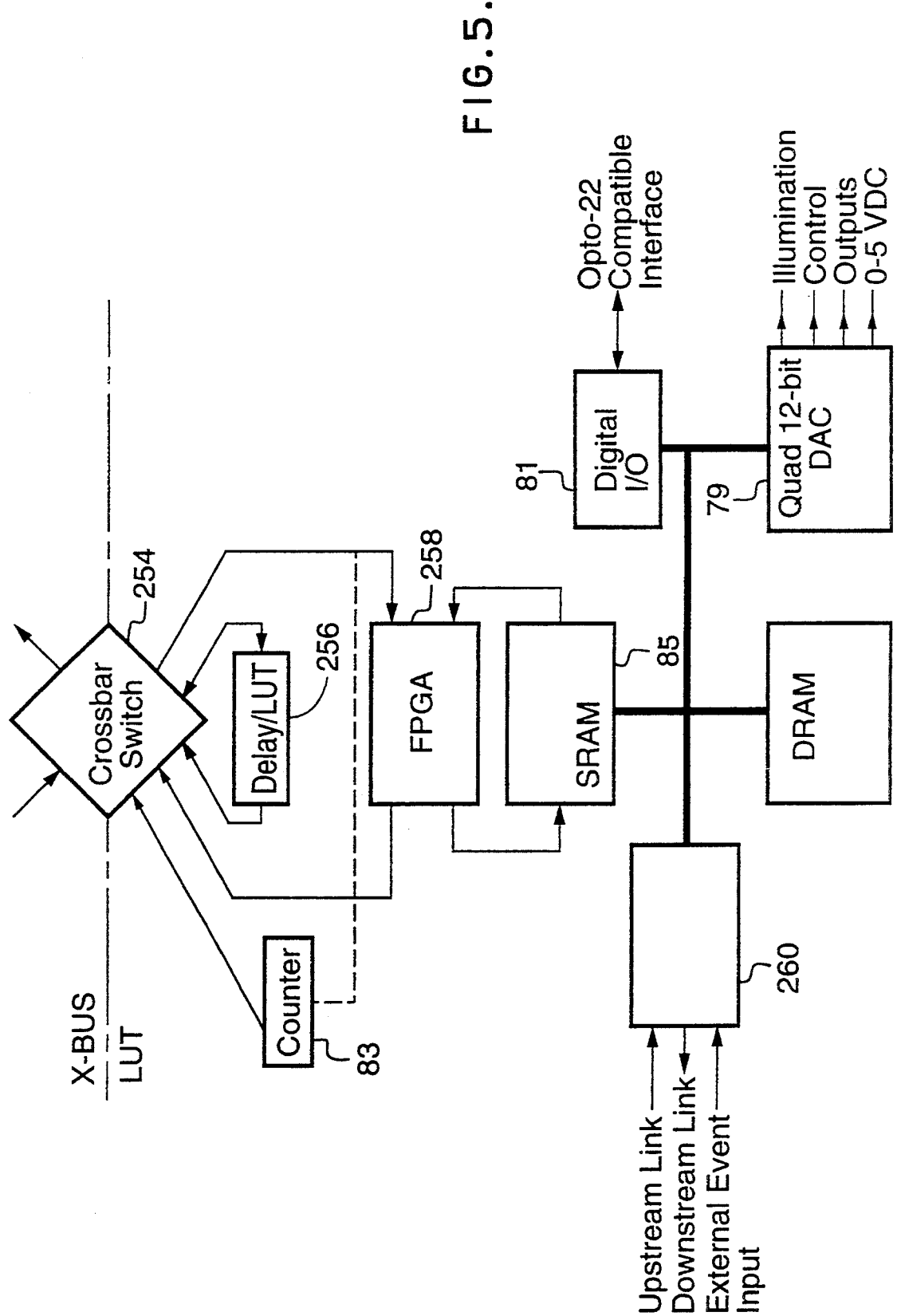
FIG. 5 is a schematic of a lookup table module of the invention of FIG. 1.

Referring to FIG. 5, the look-up table module 46 (LUT) performs real time look-up table transformations and histogram generation on incoming video data streams. The LUT module 46 is equipped with multipurpose digital to analog output 79 and digital 24 bit input output (I/O) 81. The digital I/O 81 is preferably a MOTOROLA MC146823 device and is electrically compatible with external standard OPTO-22 devices. Typical uses for the LUT module 46 include illuminator light level control based on computed greyscale histograms, arbitrary transforms on multiple input video streams, conventional and template-based image thresholding and histogram computation for camera and lighting calibration.

Selected input lines of I/O 81 may be configured as inputs which generate an event interrupt at the microprocessor controller 260. The processing of the LUT module 46 may be synchronized to external events.

The outputs 79 and 81 are connected to the microprocessor controller 260 and the static RAM memory SRAM 85. Static memory 85 is connected to the circuit FPGA 258 which is connected between the output and input of the crossbar switch 254. FPGA 258 controls the pixel processing functions of the module and the interrupts from the pixel processing unit to the microprocessor 260.

The analog output 79 preferably provides four analog output channels of 12 bit resolution. Each analog output is controlled by two registers within the memory map of microprocessor 260. The outputs of analog output 79 are utilized to control external sub-systems such as light sources.

If the speed of the object passing the sensors slows down or speeds up, the sensor scan rate also speeds up or slows down proportionately. Accordingly, the amount of light gathered per scan increases or decreases. The shifting of image intensity is undesirable. In order to compensate for changes in speed, the analog outputs are programmed to modulate the output power of the light source. When utilized in conjunction with the histogram generator, the LUT module may be utilized to monitor the light level and adjust it to maintain a constant intensity even though the object speed varies.

The LUT module 46 performs two primary functions. First, the LUT module will transform the video data utilizing a look-up table. Secondly, the LUT module will undertake histogram computation.

Video data streams with arbitrary pixel sizes are routed into the LUT module via the crossbar switch 254. The delay/LUT 256 automatically aligns time-shifted video data streams prior to LUT processing. The pixel counter 83 provides an index count for each pixel in each line of incoming video data. The output of this counter is applied to the histogram unit to generate histograms on a per pixel basis.

Delay/LUT 256 is utilized to realign the video signals. Video signal A is presented to delay/LUT 256. The line valid signal from B is also presented to delay/LUT 256. The output of the delay/LUT 256 is signal C which contains the video data of A but has been delayed by the lead time interval such that it is now aligned with video signal B. A line valid signal of B is now the line valid signal for both video signals B and C.

The delay/LUT 256 can not only align two streams of video data but also add a fixed pixel delay to the video data stream, add a fixed line delay to the video data stream, count pixels in a line of video, measure lag between two video streams and read a bit from the crossbar switch 254.

In the histogram mode, a continuous histogram is generated on the video data stream which results accumulate in the static RAM memory 85. By appropriately configuring the crossbar switch 254, the histogram can be generated based on pixel value, pixel index, or a combination of the two. The results from the histogram generation are directly accessible by the microprocessor and can be uploaded to the host on request.

In the LUT mode, the module generates a continuous output video data stream by performing a look-up table transformation on the input video data stream. The lookup table transformation includes any transformation or filtering process which reduces the amount of data while preserving the information of interest. In this manner, defects or other areas of interest can be highlighted or emphasized. In LUT mode, color-space conversions can be performed.

In the preferred embodiment, the LUT accepts up to 21 bits of video input and generates eight bits of video output. The LUT memory is directly accessible by the microprocessor controller and can be uploaded or downloaded from the host under software control.

Figure 6:
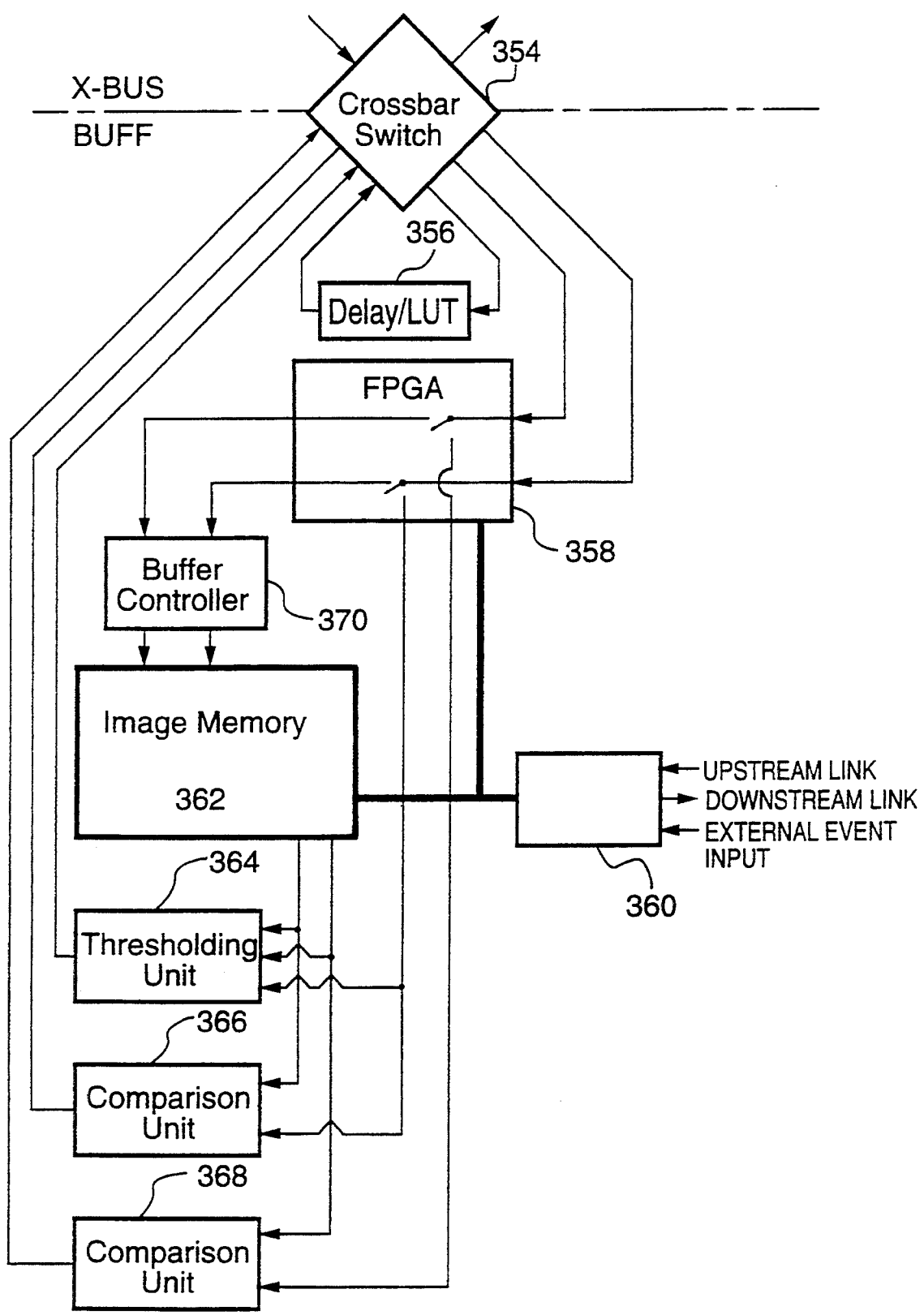
FIG. 6 is a schematic of a buffer module of the invention of FIG. 1.

Referring to FIG. 6, the buffer module 48 provides continuous image capture, template comparison and image output. Preferably, the buffer module 48 operates up to 40M pixels per second, comprising a pair of 8 bit channels operating at 20 Mhz each.

The buffer module 48 comprises an FPGA circuit 358 for selecting between storing a live video image and sending it directly to the thresholding unit 364 or comparison units 366 and 368 directly. The output of FPGA circuit 358 is fed into a buffer controller 370 which is fed into image memory 362 which has up to 256 MB of image memory that can capture or output continuous video streams to and from the video bus 164. The buffer module 48 can receive and store one or two 8 bit streams of video data. The stored data can then be scanned out. Alternatively, a "golden template" image or pattern of the object being inspected can be loaded into the buffer module and scanned out for self testing the processor 10. Image memory 362 transfers from the video bus 164 are supervised by the buffer controller 360. The controller 360 processes a sequence of image transfer commands that specify the size and location of the video data transfer. The crossbar switch 354 routes the video data into and out of the module.

The buffer module 48 can perform two pixel processing functions: thresholding and comparison. The thresholding unit 364 compares an incoming 8-bit video stream with a scanned stream of template data comprising high and low thresholds stored in image memory 362. The output of the threshold unit is a binary or quaternary video stream representing one of the following results on a per pixel basis:

1. Incoming pixel value either greater than or less than high or low threshold;
2. Incoming pixel value either within thresholds or outside of thresholds; and
3. Incoming pixel values above high threshold, below low threshold or between high and low thresholds.

During the comparison function, the comparison units 366 and 368 generate an 8 bit video stream based on a difference transformation of an 8-bit bus video stream and a "golden template" image stored in image memory. Two comparison units 366 and 368 operate simultaneously enabling a single buffer module to process two 8-bit data streams. The "golden template" image is subtracted from the incoming live video data stream and the resulting difference image represents the defects existing in the object being inspected.

Figure 7:
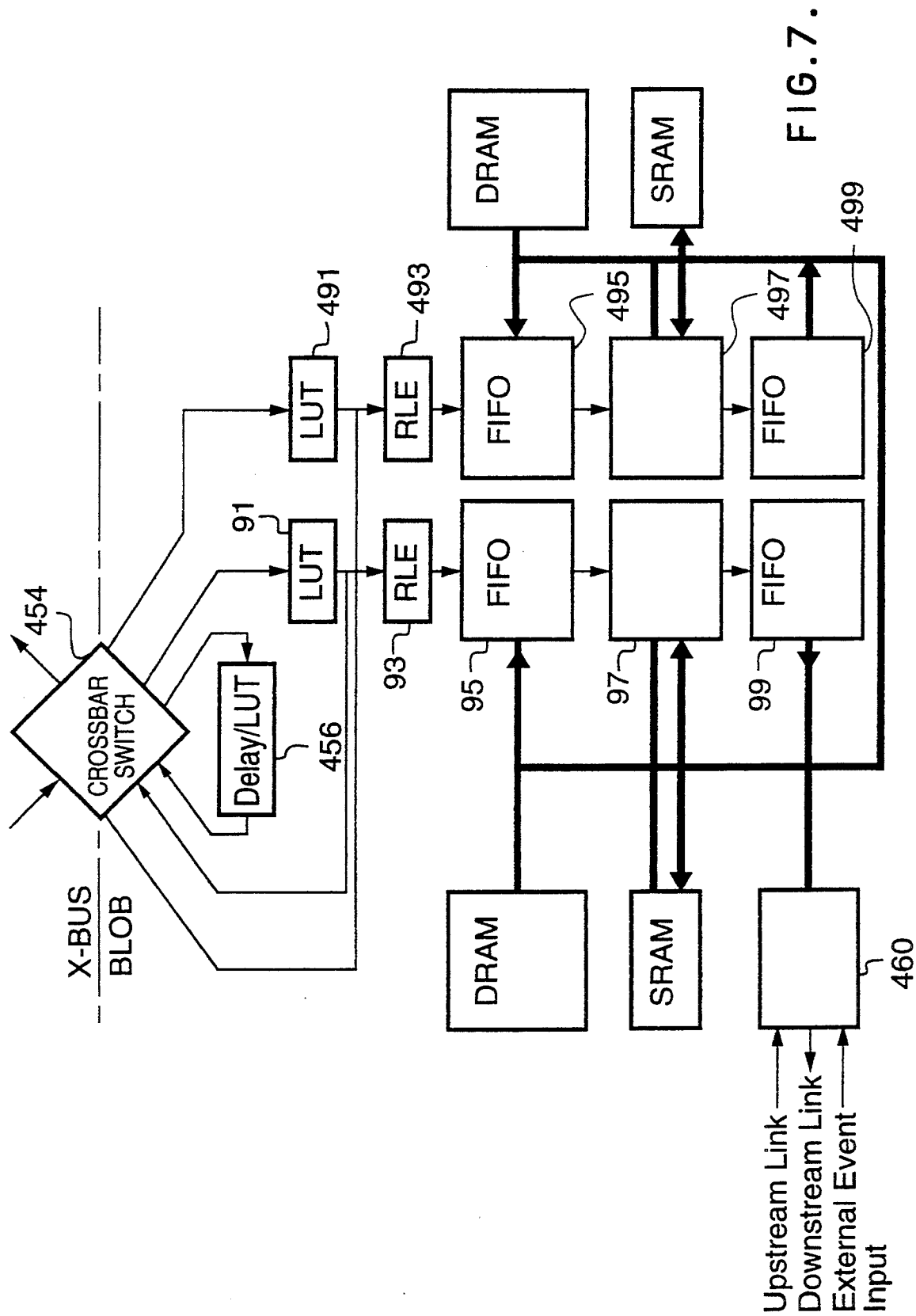
FIG. 7 is a schematic of a blob module of the invention of FIG. 1.

Referring to FIG. 7, the blob module 51 comprises a look-up table (LUT) 91 connected to a grey scale run-length encoder (RLE) 93, serially connected to a FIFO circuit 95, serially connected to a blob processor 97 and serially connected to a FIFO circuit 99. The blob module 51 performs continuous connectivity analysis on two incoming video data streams. The blob module 51 comprises a second parallel line comprising a look-up table (LUT) 491 connected to a grey scale run-length encoder (RLE) 493, serially connected to a FIFO circuit 495, serially connected to a blob processor 497 and serially connected to a FIFO circuit 499.

The blob module 51 receives video data from the video bus 164, extracts object features and reports them to the host computer 52. The incoming video data of the difference image is received from the video bus 164 and presented to a 10 bit look-up table (LUT). The LUT quantizes the difference image. The resulting 8-bit video stream enters the grey scale run-length encoder (RLE) which converts the video data into a continuous stream of RLE segments or tokens. The RLE segments or tokens are pushed onto a FIFO 95 which acts as a buffer when feature frequency is high. The blob processor 97 then reads the RLE segment or token stream from the queue of FIFO 95 and performs real-time connectivity analysis to extract object descriptor information or blob features such as defect position, area, size and color. The blob features are pushed onto output FIFO 99 from which the microprocessor 460 reads and then reports to the host computer 52. The host computer 52 utilizes the defect information to perform process monitoring and control.

The blob module 51 is not restricted to binary blob processing. Both RLE and blob data is a grey scale providing up to 256 different blob simultaneously. This grey scale blob information is utilized to detect and discriminate subtle features.

The blob module 51 may also compute second and third order moments for all detected blobs. Higher order moments are useful for determining an object's shape characteristics such as eccentricity. Moment calculations are performed in software but could be undertaken in hardware.

Referring to FIGS. 3A, 3B and 3C, the processor system operates in the following manner: line scan sensors 42 are connected to the sensor module 44. Incoming video data is normalized to remove non-uniformities in background illumination. Normalized video data is placed onto the video bus 164 via the crossbar switch 154. The video data may also be captured from the video bus into video RAM and displayed to a monitor 124.

The normalized video data is switched from the video bus into the buffer module 48. There, the thresholding circuit performs greyscale median filtering. This eliminates extraneous "popcorn noise" from the image. The filtered image data is then placed back onto the video bus 164 via the crossbar switch 354.

The filtered video data is then switched from the video bus 164 into the blob module 51. First a lookup table operation is performed to segment the grey levels in the image. Next the image data is run length encoded (RLE) and pushed onto a FIFO. The blob engine reads the tokens and performs real-time connectivity analysis. The blob feature data is pushed onto an output FIFO.

Finally the microprocessor 460 reads the blob feature data from the FIFO and sends it to the host 52 via the high speed communications link. Typically, the host computer performs statistical analysis on the feature data in order to monitor the quality of the product. This information may also be utilized to perform process control.

It is apparent that a LUT module 46 could be serially inserted into the pipeline for modulating the output power of the light source.

It is now apparent to a person skilled in the art that there are numerous other modifications and purposes of this invention. It is to be understood that certain changes in design, size and components may be effective without a departure from the spirit of the invention and within the scope of the appended claims.

We claim:

1. A processor for continuously processing video data of an object moving relative to at least one line scan sensor to extract features and measurements of the object and outputting said features and measurements to a host computer, said processor comprising:

a plurality of parallel channels having an upstream end and a downstream end, each of said channels comprising:

a pipeline video data bus for continuously receiving video data at the upstream end and transferring the video data to the downstream end, a plurality of modules connected along the pipeline video data bus, each module of said plurality of modules comprising:

a crossbar switch connected to the pipeline video bus, said crossbar switch directing the video data into, within and out of said module, a pixel processing element connected to the crossbar switch, said pixel processing element performing a continuous operation on said video data for extracting features and measurements therefrom, a microprocessor operably integrated within each module for controlling the operation thereof, each microprocessor of said plurality of modules serially connected together for transmitting and undertaking commands issued by a host computer for controlling the operation of said processor.

2. A processor as claimed in claim 1 wherein said crossbar switch of each module comprises a first input connected to the video bus for receiving video data from upstream thereof, a second input for receiving video data from within the module, a first output connected to the video bus for transferring video data downstream thereof and a second output for transferring video data to within the module.

3. A processor as claimed in claim 2 wherein each module of said plurality of modules includes a delay line and look-up table connected to said crossbar switch aligning said video data.

4. A processor as claimed in claim 3 wherein said look-up table line comprises a RAM memory and said delay line comprises a FIFO memory.

5. A processor as claimed in claim 4 wherein said plurality of modules includes a sensor module, wherein the pixel processing element thereof receives the video data from said at least one line scan sensor, normalizes the video data and transfers the video data to the video data bus.

6. A processor as claimed in claim 5 wherein said sensor module includes a video image generator connected to said crossbar switch and connectable to a video monitor, wherein said video generator receives a copy of the video data and transforms the video data to a video image output of the object.

7. A processor as claimed in claim 6 wherein said sensor module includes a sensor interface for synchronizing and controlling said at least one line scan sensor, an encoder interface for receiving an encoder signal proportional to the object moving relative to said at least one line scan sensor and transmitting said encoder signal to said sensor interface, said sensor interface generating a lamp control signal for regulating a lamp for illuminating the object and a sensor control signal for controlling said at least one line scan sensor, both said lamp control signal and sensor control signal responsive to the encoder signal.

8. A processor as claimed in claim 4 wherein said plurality of modules includes a look-up table module, wherein the pixel processing element of the look-up table module performs pixel transformations and histogram computations on the video data.

9. A processor as claimed in claim 8 wherein said pixel processing element of the look-up table module comprises an output connectable to a power source of a light source for illuminating said object, whereby the pixel processing element of said look-up table continuously undertakes said histogram computations and generates a signal for modulating said power source for maintaining a substantially constant light intensity illuminating said object.

10. A processor as claimed in claim 4 wherein said plurality of modules includes a buffer module, wherein the pixel processing element of the buffer module comprising a memory for storing a golden template image and said pixel processing element of the buffer module subtracts said golden template image from the video data for extracting a difference image.

11. A processor as claimed in claim 10 wherein said buffer module simultaneously processes at least two streams of video data.

12. A processor as claimed in claim 4 wherein said plurality of modules includes a blob module, wherein the pixel processing element of the blob module performs greyscale connectivity analysis on said difference image for extracting object descriptor information thereby extracting said features and measurements.

13. A processor as claimed in claim 12 wherein said blob module simultaneously processes at least two streams of video data.

14. A processor for manipulating video data of an image of an object moving relative to at least one line scan sensor and outputting information extracted from the video image to a host computer, said processor comprising:
  a plurality of parallel channels having an upstream end and a downstream end, each of said channels comprising:
    a video data bus for continuously transferring video data from the upstream end to the downstream end,
    a plurality of modules serially connected along the video data bus, each module of said plurality of modules comprising:
      a crossbar switch connected to the video bus, said crossbar switch directing video data into, within and out of said module,
      a pixel processing element connected to the crossbar switch, said pixel processing element performing an operation on said video data,
      a delay line and look-up table connected to said crossbar switch for aligning video data,
      a microprocessor operably integrated within each module for controlling the operation thereof, said microprocessor of each module of said plurality of modules serially connected together for transmitting and undertaking commands;
    said plurality of modules includes:
      a sensor module for receiving the video data from said at least one line scan sensor and transferring the video data to the crossbar switch of the sensor module, said sensor module comprising
        a sensor interface for synchronizing and controlling said at least one line scan sensor, an encoder interface for receiving an encoder signal proportional to the relative movement of the object and transmitting said encoder signal to said sensor interface, said sensor interface generating a lamp control signal for modulating a light source illuminating the object and a sensor control signal responsive to the encoder signal, said sensor control signal for controlling the operation of the at least one line scan sensor,
        an offset circuit and a normalization circuit connected between the sensor interface and the crossbar switch, said offset circuit and normalization circuit for minimizing effects of background noise on the video data as the video data is transferred from the sensor interface to the crossbar switch, and
        a video display generator connected to said crossbar switch and connectable to a video monitor, said video generator receives a copy of the video data and transforms the video data to a video display output;
      a buffer module for storing a golden template image and template matching a high resolution image with said golden template image and generating a difference image,
      a blob module for performing greyscale connectivity analysis on said difference image for extracting object descriptor information.

15. A processor as claimed in claim 14 wherein said plurality of modules further includes a look-up table module for performing pixel transformations and histogram computations on the video data, said look-up table module is connectable to a power source of the light source illuminating said object, whereby said look-up table continuously undertakes histogram computations and generates a signal for modulating the power source for maintaining a substantially constant light intensity illuminating said object.

16. A method of continuously processing video data of an object moving relative to at least one line scan sensor to extract features and measurements of the object, said method comprising the steps of:
  synchronizing and controlling at least one line scan sensor generating a video image of the object comprising a stream of video data;
  normalizing the stream of video data;
  transferring the stream of video data to a video data bus;
  comparing the stream of video data with a golden template image of the object and generating a difference image;

performing greyscale connectivity analysis on the difference image and extracting features and measurements;

outputting said features and measurements to a host computer.

17. A method as claimed in claim 16 wherein said method further includes a step of performing histogram computations on the stream video data and generating a signal for modulating a power source for a light source illuminating the object, maintaining a substantially constant light intensity illuminating said object.

18. A method as claimed in claim 16 wherein said method further includes transferring a copy of the stream of video data to a video generator and generating a video display of the object.

19. A method as claimed in claim 16 wherein said method simultaneously processes in parallel at least two streams of video data.

20. A method as claimed in claim 16 wherein said stream of video data is filtered prior to the step of comparing the stream of video data with said golden template image of the object and generating said difference image.

* * * * *